Jan. 14, 1958            J. E. JONES            2,819,964
SUPERSENSITIZING COMBINATIONS COMPRISING MESO-SUBSTITUTED
CARBOCYANINE DYES AND METAL SALTS
Filed March 8, 1955

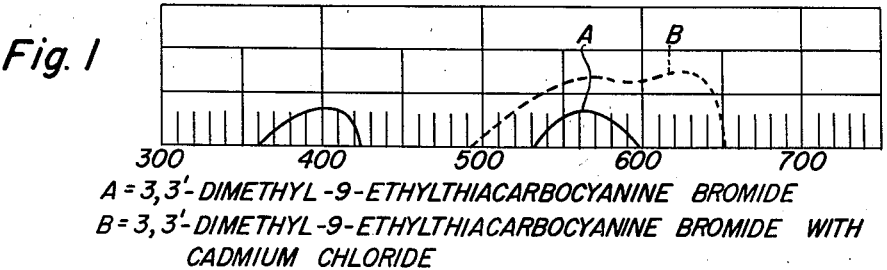

Fig. 1

A = 3,3'-DIMETHYL-9-ETHYLTHIACARBOCYANINE BROMIDE
B = 3,3'-DIMETHYL-9-ETHYLTHIACARBOCYANINE BROMIDE WITH
     CADMIUM CHLORIDE

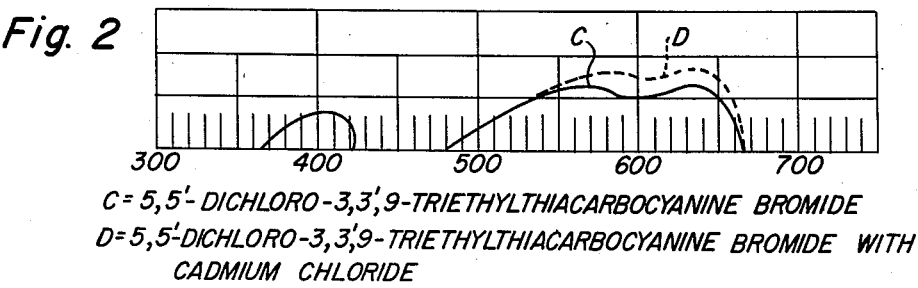

Fig. 2

C = 5,5'-DICHLORO-3,3',9-TRIETHYLTHIACARBOCYANINE BROMIDE
D = 5,5'-DICHLORO-3,3',9-TRIETHYLTHIACARBOCYANINE BROMIDE WITH
     CADMIUM CHLORIDE

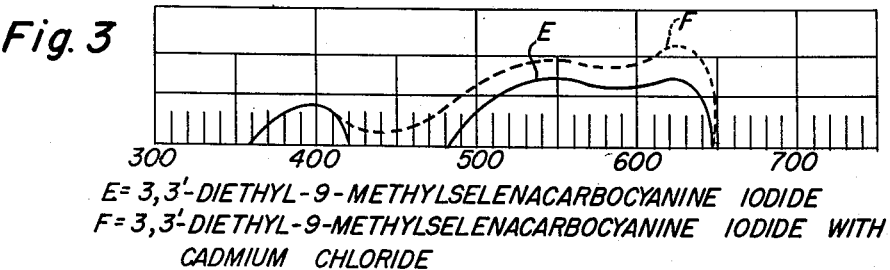

Fig. 3

E = 3,3'-DIETHYL-9-METHYLSELENACARBOCYANINE IODIDE
F = 3,3'-DIETHYL-9-METHYLSELENACARBOCYANINE IODIDE WITH
     CADMIUM CHLORIDE

JEAN E. JONES
INVENTOR.

BY

ATTORNEYS

United States Patent Office 2,819,964
Patented Jan. 14, 1958

2,819,964
SUPERSENSITIZING COMBINATIONS COMPRISING MESO-SUBSTITUTED CARBOCYANINE DYES AND METAL SALTS

Jean E. Jones, Rochester, N. Y., assignor to Eastman Kodak Company, Rochester, N. Y., a corporation of New Jersey Application March 8, 1955, Serial No. 492,951

18 Claims. (Cl. 96—104)

This invention relates to photographic emulsions containing meso-substituted carbocyanine dyes, and in supersensitizing combination therewith, certain metal salts.

It is known in the art of making photographic emulsions that certain dyes of the cyanine class alter the sensitivity of photographic emulsions of the gelatino-silver-halide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i. e., increasing the alkalinity) or both. Thus, sensitization can be increased by bathing plates, coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities.

I have now found a new means of altering the sensitivity in emulsions containing cyanine dyes. Since the conditions in the emulsion, i. e., the hydrogen ion and/or the silver ion concentration undergo no significant change in my method, I shall designate my new method as a kind of supersensitization.

It is, therefore, an object of my invention to provide photographic emulsions containing meso-substituted carbocyanine dyes, and in supersensitizing combination therewith, certain metal salts. Another object is to provide a process for preparing these supersensitized emulsions. Other objects will become apparent from a consideration of the following description and examples.

The chain-substituted carbocyanine dyes useful in practicing my invention can advantageously be represented by the following general formula:

(I) 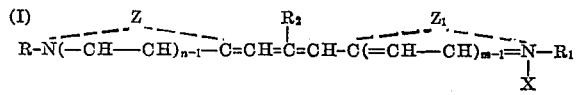

wherein R, $R_1$ and $R_2$ each represents an alkyl group, such as methyl, ethyl, n-propyl, etc. (e. g., an alkyl group containing from 1 to 2 carbon atoms, etc.), $m$ and $n$ each represents a positive integer of from 1 to 2, X represents an acid radical, such as chloride, iodide, bromide, perchlorate, p-toluenesulfonate, benzenesulfonate, ethylsulfate, methylsulfate, etc., and Z and $Z_1$ each represents the non-metallic atoms necessary to complete a heterocyclic nucleus containing from 5 to 6 atoms in the heterocyclic ring, e. g., a heterocyclic nucleus of the thiazole series (e. g., thiazole, 4-methylthiazole, 4-phenylthiazole, 5-methylthiazole, 5-phenylthiazole, 4,5-dimethylthiazole, 4,5-diphenylthiazole, etc.), a heterocyclic nucleus of the benzothiazole series (e. g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethoxybenzothiazole, 5-hydroxybenzothiazole, 6-hydroxybenzothiazole, etc.), a heterocyclic nucleus of the naphthothiazole series (e. g., α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), a heterocyclic nucleus of the benzoselenazole series (e. g., benzoselenazole, 5-chlorobenzoselenazole, 6-methoxybenzoselenazole, 5-methoxybenzoselenazole, etc.), a heterocyclic nucelus of the naphthoselenazole series (e. g., α-naphthoselenazole, β-naphthoselenazole, etc.), a heterocyclic nucleus of the oxazole series (e. g., 4-methyloxazole, 5-methyloxazole, 4-phenyloxazole, 4,5-diphenyloxazole, 4-ethyloxazole, 4,5-dimethyloxazole, 5-phenyloxazole, etc.), a heterocyclic nucleus of the benzoxazole series (e. g., benzoxazole, 5-hydroxybenzoxazole, 6-hydroxybenzoxazole, 5-chlorobenzoxazole, 5-methoxybenzoxazole, 6-methoxybenzoxazole, 5-phenylbenzoxazole, 5-bromobenzoxazole, etc.), a heterocyclic nucleus of the naphthoxazole series (e. g., α-naphthoxazole, β-naphthoxazole, etc.), a heterocyclic nucleus of the 2-quinoline series (e. g., 2-quinoline, 6-methyl-2-quinoline, 7-methyl-2-quinoline, 8-methyl-2-quinoline, 6-chloro-2-quinoline, 8-chloro-2-quinoline, 4-chloro-2-quinoline, 5-ethoxy-2-quinoline, 6-ethoxy-2-quinoline, 7-ethoxy-2-quinoline, 6-hydroxy-2-quinoline, 7-hydroxy-2-quinoline, 6-methoxy-2-quinoline, etc.), a heterocyclic nucleus of the 4-quinoline series (e. g., 4-quinoline, 6-methoxy-4-quinoline, 7-methyl-4-quinoline, 8-methyl-4-quinoline, etc.), etc.

The metal salts which can be used in practicing my invention can advantageously be represented by the following general formula:

(II) $$M(X_1)_2$$

wherein M is a cadmium or zinc atom and $X_1$ is a chlorine or bromine atom. Cadmium chloride has been found to be particularly useful in practicing my invention.

It has also been found that the dyes of Formula I above can be employed together with the metal salts of Formula II in photographic emulsions which contain certain un-ionized dyes. While improvement in speed (sensitivity) in emulsions containing the sensitizing dyes of Formula I is provided by the metal salts of Formula II, still greater speeds are possible when an un-ionized dye, as hereinafter defined, is present, and without attendant harmful effects.

The un-ionized dyes useful in practicing my invention can advantageously be represented by the following general formula:

(III) 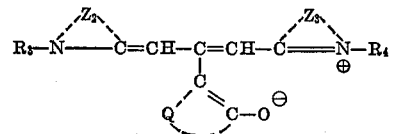

wherein $R_3$ and $R_4$ each represents an alkyl group, i. e., an alcohol radical, e. g., methyl, ethyl, n-propyl, n-butyl, β-hydroxyethyl, carbethoxymethyl, benzyl (phenylmethyl), etc., Q represents the non-metallic atoms necessary to complete an indandione nucleus or a heterocyclic nucleus containing from 5 to 6 atoms in the heterocyclic ring, such as those of the pyrazolone series (e. g., 3-methyl-1-phenyl-5-pyrazolone, 1-phenyl-5-pyrazolone, 1-(2-benzothiazolyl-3-methyl-5-pyrazolone, etc.), those of the isoxazolone series (e. g., 3-phenyl-5-(4H)-isoxazolone, 3-methyl-5(4H)-isoxazolone, etc.), those of the indandione series (e. g., 1,3-diketohydrindene, etc.), those of the oxindole series (e. g., 1-alkyl-2,3-dihydro-2-oxindoles, etc.), those of the 2,4,6-triketohexahydropyrimidine series (e. g., barbituric acid or 2-thiobarbituric acid as well as their 1-alkyl (e. g., 1-methyl, 1-ethyl, 1-n-propyl, 1-n-heptyl, etc.), or 1,3-dialkyl (e. g., 1,3-dimethyl, 1,3-diethyl, 1,3-di-n-propyl, 1,3-diisopropyl, 1,3-dicyclohexyl, 1,3-di(β-methoxyethyl), etc.), or 1,3-diaryl (e. g., 1,3-diphenyl, 1,3-di(p-chlorophenyl), 1,3-di(p-ethoxycarbonylphenyl), etc.), or 1-aryl (e. g., 1-phenyl, 1-p-chlorophenyl, 1-p-ethoxycarbonylphenyl), etc.) or 1-alkyl-3-aryl (e. g., 1-ethyl-3-phenyl, 1-n-heptyl-3-phenyl), etc.) derivatives, those of the rhodanine series (i. e., 2-thio-2,4-thiazolidinedione series), such as rhodanine, 3-alkylrhodanines (e. g., 3-ethylrhodanine, 3-allylrhodanine, etc.) or 3-arylrhodanines (e. g., 3-phenylrhodanine, etc.), etc., those of the 2(3H)-imidazo-[1,2-a]-pyridone series, those of the 5,7-dioxo-6,7-dihydro-5-thiazolo [3,2-a]-pyrimidine series (e. g., 5,7-dioxo-3-phenyl-6,7-dihydro-5-thiazole [3,2-a]-pyrimidine, etc.), those of the 2-thio-2,4-oxazolidinedione series (i. e., those of the 2-thio-2,4-(3H, 5H)-oxazoledione series) (e. g., 3-ethyl-2-thio-2,4-oxazolidinedione, etc.) those of the thianaphthenone series (e. g., 2(3H)-thianaphthenone, etc.), those of the 2-thio-2,5-thiazolidinedione series (i. e., the 2-thio-2,5(3H, 5H)-thiazoledione series) (e. g., 3-ethyl-2-thio-2,5-thiazolidinedione, etc.), $Z_2$ represents the non-metallic atoms necessary to complete a heterocyclic nucleus containing from 5 to 6 atoms in the heterocyclic ring, e. g., a heterocyclic nucleus of the benzothiazole series (e. g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 6-iodobenzothiazole, 5-iodobenzothiazole, 4-ethoxybenzothiazole, 5-ethoxybenzothiazole, 5,6-dimethoxybenzothiazole, 5-hydroxybenzothiazole, 6-hydroxybenzothiazole, 7-hydroxybenzothiazole, etc.), a heterocyclic nucleus of the naphthothiazole series (e. g., α-naphthothiazole, β-naphthothiazole, 7-methoxy-α-naphthothiazole, 8-methoxy-α-naphthothiazole, 5-methoxy-β-naphthothiazole, 5-ethoxy-α-naphthothiazole, etc.), a heterocyclic nucleus of the benzoselenazole series (e. g., benzoselenazole, 5-chlorobenzoselenazole, 6-methoxybenzoselenazole, 5-methoxybenzoselenazole, etc.), a heterocyclic nucleus of the naphthoselenazole series (e. g., α-naphthoselenazole, β-naphthoselenazole, etc.), a heterocyclic nucleus of the naphthoxazole series (e. g., α-napthhoxazole, β-naphthoxazole, etc.), etc. and $Z_3$ represents the non-metallic atoms necessary to complete a heterocyclic nucleus of the naphthothiazole series (such as those listed above for $Z_2$) or the naphthoselenazole series (such as those listed above for $Z_2$).

Dyes of Formula III above which have been found to be particularly useful in practicing my invention include dyes selected from those represented by the following general formula:

(IV)
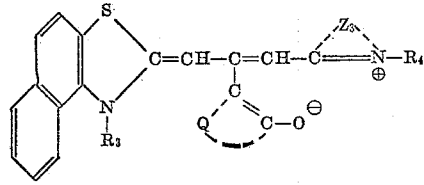

wherein $R_3$, $R_4$, $Z_3$ and Q each have the values given above. Particularly useful are those dyes wherein Q represents the non-metallic atoms necessary to complete a heterocyclic nucleus of the barbituric acid series and $Z_3$ represents the non-metallic atoms necessary to complete a heterocyclic nucleus of the naphthothiazole series or the naphthoselenazole series.

The dyes represented by Formula I above can be prepared according to the methods described in Koslowsky U. S. Patent 2,107,379, issued February 8, 1938, or Brooker and White U. S. Patent 2,112,140, issued March 22, 1938, for example.

The dyes represented by Formulas III and IV above can advantageously be prepared as described in the copending application Serial No. 375,279, filed August 19, 1953 (now U. S. Patent 2,739,964, issued March 27, 1956), in the names of L. G. S. Brooker and F. L. White.

My invention is directed to the supersensitization of washed, photographic silver chloride or silver chlorobromide emulsions. Other silver halide emulsions, e. g., silver bromiodide emulsions, do not generally provide the improved supersensitizing results of my invention.

According to my invention, I incorporate one or more of the carbocyanine dyes selected from those represented by Formula I above, alone or together with an unionized dye selected from those represented by Formula III (or IV) with one or more of the metal salts selected from those represented by Formula II in a washed, photographic silver chloride or silver chlorobromide emulsion. My supersensitizing combinations can be employed in photographic emulsions where the carrier is gelatin, or where the carrier is other than gelatin, e. g., a resinous substance or cellulosic material which has no deteriorating effect on the light-sensitive materials.

The sensitizing dyes and metal salts can be employed in various concentrations depending upon the effects desired. As is well known in the art, the sensitivity conferred upon an emulsion by a sensitizing dye does not increase proportionately to the concentration of the dye in the emulsion, but rather passes through a maximum as the concentration is increased. In practicing my invention, the sensitizing dyes of Formula I (or III and IV) are advantageously employed at or near their optimum concentration.

The optimum concentration of an individual sensitizing dye can be determined in a manner well known to those skilled in the art by measuring the sensitivity of a series of test portions of the same emulsion, each portion containing a different concentration of the sensitizing dye. Ordinarily, the optimum or near optimum concentrations of the dyes (total for all dyes) selected from those represented by Formula I above, which I employ in practicing my invention, are of the order of from 0.1 to 0.3 g. per mol. of silver halide in the emulsion.

The metal salts selected from those represented by Formula II above can advantageously be employed in concentrations on the order of from 5 to 35 g. per mol of silver halide in the emulsion.

Generally speaking, the ratio of concentration of the dyes of Formula I (or III and IV) to the metal salt of Formula II can vary rather widely in my combinations. e. g., from 1:10 to 1:200 by weight in many cases.

The methods of incorporating insensitizing dyes and metal salts in emulsions are well known to those skilled in the art. The metal salts can be directly dispersed in the emulsions or they can be dissolved in water and added in the form of their aqueous solutions. While the sensitizing dyes can be directly dispersed in the emulsions, it is convenient to add the dyes in the form of solutions in appropriate solvents. Methanol, ethanol, pyridine, etc. have proven satisfactory for many of the dyes of Formula I (or III and IV). Acetone has also been found to be a suitable solvent in certain cases. Mixtures of solvents, e. g., pyridine diluted with methanol or acetone, can also be used. The dyes of Formula I (or III and IV) and the metal salts of Formula II are dispersed in the finished, washed emulsions and should be uniformly distributed throughout the emulsions. The following procedure is satisfactory: Stock solutions of the sensitizing dyes and metal salts desired are prepared by dissolving the same in appropriate solvents as described above. Then, to the flowable gelatino-silver-chloride or silver-chlorobromide emulsion, the desired amounts of the stock solution of the dyes (or metal salts) are slowly added, while stirring the emulsion. Stirring is continued until the dye (or dyes) is thoroughly incorporated in the emulsion. Then the desired amount of the stock solution of the metal salt (or dye, if metal salt has been added first) is slowly added to the emulsion, while stirring. Stirring is continued until the second solution is thoroughly incorporated. The supersensitized emulsion can then be coated out on a suitable support, such as glass, cellulose derivative film, resin film, or paper, to a suitable thickness and allowed to dry. The details of such coating methods are well known to those skilled in the art. The foregoing procedures and proportions are to be regarded only as illustrative. Clearly, my invention is directed to any washed silver chloride or silver chlorobromide emulsion containing a combination of the aforesaid sensitizing dyes and metal salts whereby a supersensitizing effect is obtained.

The metal salts of Formula II are useful not only in their supersensitizing effect, but in that they exhibit an effect in stabilizing the emulsions against fog. This concomitant effect is illustrated below.

The following examples will serve to illustrate further the manner of practicing my invention.

In Table I below, to different portions of the same batch of washed photographic gelatino-silver-chlorobromide emulsion were added (1) a dye selected from those of Formula I and (2) a combination of the cyanine dye of Formula I and cadmium chloride in the amounts shown in the table. Before coating, the emulsions were digested for a short time in a tank maintained at 52° C. The different portions of emulsion were then coated on supports and exposed in the usual manner in a spectrograph and a sensitometer (Type Ib) through a Wratten No. 12 filter, i. e., a filter which transmits substantially no light of wavelength shorter than about 495 mu (except for about 1% between 300 and 340 mu), and the exposed emulsions developed in the usual manner. The speed (minus blue), gamma and fog for each of the coatings was then measured. The coatings were all made from the same batch of emulsion.

Table I

| Example | | Dye (g./mol. AgX) | CdCl$_2$ (g./mol. AgX) | 10/i Speed | Gamma | Fog |
|---|---|---|---|---|---|---|
| 1 | (a) | 3,3'-dimethyl-9-ethylthiacarbocyanine bromide (0.20) | none | .42 | 3.4 | .05 |
|   | (b) | dye (a) (0.20) | 20.0 | 1.9 | 1.7 | .05 |
| 2 | (c) | 5,5'-diphenyl-3,3',9-triethyloxacarbocyanine iodide (0.20) | none | 4.7 | 2.8 | .06 |
|   | (d) | dye (c) (0.20) | 20.0 | 8.4 | 3.8 | .09 |
| 3 | (e) | 3,3'-diethyl-9-methyloxacarbocyanine iodide (0.20) | none | 5.0 | 2.5 | .05 |
|   | (f) | dye (e) (0.20) | 20.0 | 5.9 | 2.6 | .05 |
| 4 | (g) | 5,5'-dichloro-3,3',9-triethylthiacarbocyanine bromide (0.20) | none | 1.8 | 1.7 | .06 |
|   | (h) | dye (g) (0.20) | 20.0 | 3.6 | 2.0 | .06 |
| 5 | (i) | 3,3'-diethyl-9-methylselenacarbocyanine iodide (0.20) | none | 4.8 | 1.9 | .06 |
|   | (j) | dye (i) (0.20) | 20.0 | 6.8 | 2.3 | .05 |
| 6 | (k) | 3,3',9-triethyl-5,6,5',6'-dibenzothiacarbocyanine-p-toluenesulfonate (0.20). | none | 1.35 | 2.2 | .08 |
|   | (l) | dye (k) (0.20) | 20.0 | 7.3 | 1.9 | .08 |
| 7 | (m) | 3,3'-diethyl-9-methyloxacarbocyanine iodide (0.20) | none | .50 | 5.0 | .04 |
|   | (n) | dye (m) (0.20) | 20.0 | 1.1 | 2.1 | .05 |
| 8 | (o) | 3,3'-dimethyl-9-ethyl-4,5,4',5'-dibenzoselenacarbocyanine iodide (0.20). | none | .66 | 3.1 | .05 |
|   | (p) | dye (o) (0.20) | 20.0 | 3.0 | 1.8 | .06 |
| 9 | (q) | 1',3-dimethyl-9-ethylthia-2'-carbocyanine iodide (0.20) | none | .23 | .36 | .04 |
|   | (r) | dye (q) (0.20) | 20.0 | .68 | 2.1 | .05 |
| 10 | (s) | 1,1',10-trimethyl-2,2'-carbocyanine perchlorate (0.20) | none | .16 | .48 | .05 |
|   | (t) | dye (s) (0.20) | 20.0 | .17 | 1.0 | .05 |

In Table II below, to different portions of the same batch of washed gelatino-silver-chlorobromide emulsion (Examples 11–13) or pure silver-chloride emulsion (Examples 14 and 15) were added (1) sensitizing dyes as identified in the table, (2) cadmium chloride, and (3) a combination of the sensitizing dye and cadmium chloride, in the amounts shown in the table. In some instances a given coating gave a speed and gamma too low to measure, designated (*) in the table. Before coating the emulsions were digested for a short time in a tank maintained at 52° C. The different portions of emulsion were then divided in half and coated on separate supports. The coating obtained from one-half of the portion was exposed in the usual manner in a spectrograph and a sensitometer (Type Ib) through either a Wratten No. 58 filter, i. e., a filter which transmits only light of wavelengths lying between 465 and 620 mu, or a Wratten No. 25 filter, i. e., a filter which transmits substantially no light of wavelength shorter than about 580 mu, and the exposed emulsions developed in the usual manner. The speed (green or red, designated G and R, respectively, in the table), gamma, and fog for each of the coatings was then measured. The second half of each portion of emulsion was incubated at 120° F. for one week at constant humidity and then processed in exactly the same manner as the first half. The results are recorded in the following table. The concomitant supersensitizing and stabilizing effects of the cadmium chloride are evident.

Table II

| Example | | Dye (g./mol. AgX) | CdCl$_2$ (g./mol. AgX) | Fresh | | | | Incubation—1 Week at 120° F. | | | | |
|---|---|---|---|---|---|---|---|---|---|---|---|---|
| | | | | Blue Light Exp. | | G or R Light Exp. | | Fog | Blue Light Exp. | | G or R Light Exp. | | Fog |
| | | | | Speed | Gamma | Speed | Gamma | | Speed | Gamma | Speed | Gamma | |
| 11 | (a) | none | none | .056 | 2.4 | | | .05 | (*) | (*) | | | 0.9 |
|   | (b) | A (.15) | none | .076 | 3.9 | (G) .19 | 3.1 | .04 | .102 | 5.1 | (G) .275 | 3.4 | .12 |
|   | (c) | none | 15.0 | .071 | 2.8 | | | .06 | .078 | 3.5 | | | .07 |
|   | (d) | A (.15) | 15.0 | .135 | 4.2 | (G) .43 | 4.2 | .05 | .175 | 4.0 | (G) .56 | 3.3 | .07 |
| 12 | (e) | B (.15) | none | .043 | 2.8 | (R) .105 | 5.6 | .05 | .056 | 3.6 | (R) .148 | 6.2 | .15 |
|   | (f) | B (.15) | 15.0 | .068 | 3.75 | (R) .53 | 4.0 | .07 | .082 | 3.7 | (R) .54 | 4.1 | .08 |
| 13 | (g) | C (.15) | none | .061 | 4.0 | (R)1.16 | 3.5 | .06 | .059 | 3.8 | (R) .74 | 5.1 | .15 |
|   | (h) | C (.15) | 15.0 | .108 | 4.0 | (R)2.95 | 3.0 | .08 | .105 | 4.2 | (R)2.55 | 3.6 | .08 |
| 14 | (i) | none | none | .011 | 9.2 | | | .03 | .013 | 9.0 | | | .04 |
|   | (j) | none | 15.0 | .011 | 9.0 | | | .03 | .013 | 8.6 | | | .03 |
|   | (k) | A (.24) | none | | | (G) .0035 | 5.7 | .03 | | | (G) .0054 | 9.0 | .04 |
|   | (l) | A (.24) | 15.0 | | | (G) .014 | 9.5 | .03 | | | (G) .018 | 8.5 | .04 |
| 15 | (m) | B (.24) | none | | | (R) .0027 | 2.12 | .09 | | | (R) .0035 | 4.2 | .07 |
|   | (n) | B (.24) | 15.0 | | | (R) .0059 | 7.0 | .08 | | | (R) .0053 | 7.4 | .07 |

Dye A=3,3'-dimethyl-9-ethyloxacarbocyanine iodide.
Dye B=3,3', 9-triethylselenacarbocyanine iodide.
Dye C=9-ethyl-3,3'-dimethyl-4,5,4',5'-dibenzothiacyanine chloride.

In a manner similar to that illustrated above, other metal salts, such as cadmium bromide, cadmium nitrate, cadmium acetate, lead nitrate, cobalt chloride, strontium chloride, lanthanum chloride, calcium chloride, zinc chloride, magnesium nitrate, beryllium fluoride, zinc sulfate, nickel nitrate, calcium nitrate, etc., can be employed in combination with the dyes of Formula I. However, the effect is largely one of stabilization, and to a lesser extent, supersensitization. Accordingly, cadmium chloride is most advantageously employed in practicing my invention.

The accompanying drawing illustrates the supersensitizing effect obtained with three of my new combinations of dyes in gelatino-silver-chlorobromide emulsions. Each figure of the drawing is a diagrammatic reproduction of two spectrograms. In each figure the sensitivity of the emulsion containing the carbocyanine dye of Formula I is represented by the solid curve. The uppermost curve (broken line) represents thee sensitivity conferred on the emulsion by the combination of the carbocyanine dye of Formula I and cadmium chloride.

In Figure 1 curve A represents the sensitivity of an ordinary gelatino-silver-chlorobromide emulsion sensitized with 3,3'-dimethyl-9-ethylthiacarbocyanine bromide and curve B represents the sensitivity of the same emulsion containing both 3,3'-dimethyl-9-ethylthiacarbocyanine bromide and cadmium chloride. The sensitometric measurements for these emulsions are given in Example I of Table I.

In Figure 2 curve C represents the sensitivity of an ordinary gelatino-silver-chlorobromide emulsion sensitized with 5,5' - dichloro - 3,3',9 - triethylthiacarbocyanine bromide and curve D represents the sensitivity of the same emulsion containing both 5,5'-dichloro-3,3',9-triethylthiacarbocyanine bromide and cadmium chloride. The sensitometric measurements for these emulsions are given in Example 0 of Table I.

In Figure 3 curve E represents the sensitivity of an ordinary gelatino-silver-chlorobromide emulsion sensitized with 3,3'-diethyl-9-methylselenacarbocyanine iodide and curve F represents the sensitivity of the same emulsion containing both 3,3'-diethyl-9-methylselenacarbocyanine iodide and cadmium chloride. The sensitometric measurements for these emulsions are given in Example 5 of Table I.

The emulsions prepared in accordance with my invention can be coated in the usual manner on any suitable support, e. g., glass, cellulose nitrate film, cellulose acetate film, polyvinylacetal resin film, paper or metal.

Photographic silver halide emulsions, such as those listed above, containing the supersensitizing combinations of my invention can also contain such addenda as chemical sensitizers, e. g., sulfur sensitizers (e. g., allyl thiocarbamide, thiourea, allylisothiocyanate, cystine, etc.), various gold compounds (e. g., potassium chloroaurate, auric trichloride, etc.), (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750) etc.; color couplers, such as those described in U. S. Patent 2,423,730, Spence and Carroll U. S. Patent No. 2,640,776 etc.; or mixtures of such addenda. Dispersing agents for color couplers, such as those set forth in U. S. Patents 2,322,027 and 2,304,940, can also be employed in the above-described emulsions. Other addenda, can also be employed in the emulsions of my invention, such as the azaindenes (e. g. triazaindenes, tetra- zaindenes, pentazaindenes, etc.). See, for example, U. S. Patents 2,444,605–9; 2,449,225–6, copending Allen et al. U. S. application 365,541, filed July 1, 1953 (now U. S. Patent 2,735,769, issued February 21, 1956; copending Allen et al. U. S. application 365,542, filed July 1, 1953 (now U. S. Patent 2,713,541, issued July 19, 1955); copending Carroll et al. U. S. application 365,550, filed July 1, 1953 (now U. S. Patent 2,716,062, issued August 23, 1955); Birr—"Zeit, Wiss. Phot. Photaphysik Photochemie"—vol. 47 (1952), pp. 2–28, etc.

Although cadmium chloride is added to the emulsions as such in the above examples, it is also sometimes advantageous to form the same in situ as described in my copending applications 492,950 and 493,040, filed on even date herewith. The folowing claims are intended to cover this obvious alternative in practicing my invention.

Supersensitizing combinations comprising the dyes of Formula I and those of Formula III (or IV) have been previously described in Carroll and Jones U. S. application Serial No. 403,822, filed January 13, 1954 (now U. S. Patent 2,704,714, issued March 22, 1955).

What I claim as my invention and desire secured by Letters Patent of the United States is:

1. A washed, photographic silver halide emulsion selected from the group consisting of a washed, photographic silver chloride emulsion and a washed, photographic silver chlorobromide emulsion containing (1) a sensitizing dye selected from those represented by the following general formula:

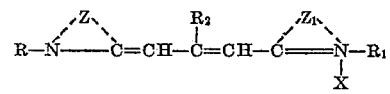

wherein R, R₁ and R₂ each represents an alkyl group, X represents an acid radical, and Z and Z₁ each represents the non-metallic atoms necessary to complete a heterocyclic nucleus selected from the group consisting of those of the benzothiazole series, those of the benzoxazole series, those of the benzoselenazole series, and those of the 2-quinoline series, and (2) from 5 to 35 grams per mol. of silver halide of cadmium chloride.

2. A washed, photographic gelatino-silver-chlorobromide emulsion containing (1) a sensitizing dye selected from those represented by the following general formula:

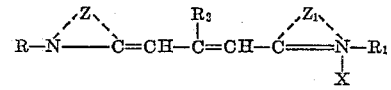

wherein R, R₁ and R₂ each represents an alkyl group containing from 1 to 2 carbon atoms, X represents an acid radical, and Z and Z₁ each represents the non-metallic atoms necessary to complete a heterocyclic nucleus selected from the group consisting of those of the benzothiazole series, those of the benzoxazole series, those of the benzoselenazole series and those of the 2-quinoline series, and (2) from 5 to 35 grams per mol. of silver chlorobromide of cadmium chloride.

3. A washed, photographic gelatino-silver-chloride emulsion containing (1) a sensitizing dye selected from those represented by the following general formula:

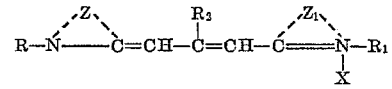

wherein R, R₁ and R₂ each represents an alkyl group containing from 1 to 2 carbon atoms, X represents an acid radical, and Z and Z₁ each represents the non-metallic atoms necessary to complete a heterocyclic nucleus selected from the group consisting of those of the benzothiazole series, those of the benzoxazole series, those of the benzoselenazole series, and those of the 2-quinoline series, and from 5 to 35 grams per mol. of silver chloride of cadmium chloride.

4. A washed, photographic silver halide emulsion selected from the group consisting of a washed, photographic silver chloride emulsion and a washed, photographic silver chlorobromide emulsion containing (1) a sensitizing dye selected from those represented by the following general formula:

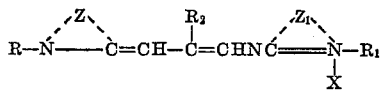

wherein R, $R_1$ and $R_2$ each represents an alkyl group containing from 1 to 2 carbon atoms, X represents an acid radical and Z and $Z_1$ each represents the non-metallic atoms necessary to complete a heterocyclic nucleus of the benzothiazole series and (2) from 5 to 35 grams per mol. of silver halide of cadmium chloride.

5. A washed, photographic gelatino-silver-chlorobromide emulsion containing (1) a sensitizing dye selected from those represented by the following general formula:

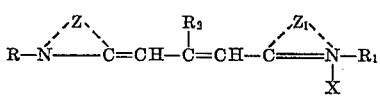

wherein R, $R_1$ and $R_2$ each represents an alkyl group containing from 1 to 2 carbon atoms, X represents an acid radical, and Z and $Z_1$ each represents the non-metallic atoms necessary to complete a heterocyclic nucleus of the benzothiazole series, and (2) from 5 to 35 grams per mol. of silver chlorobromide of cadmium chloride.

6. A washed, photographic-gelatino-silver-chlorobromide emulsion supersensitized with a supersensitizing combination comprising 3,3'-dimethyl-9-ethylthiacarbocyanine bromide and from 5 to 35 grams per mol. of silver chlorobromide of cadmium chloride.

7. A washed, photographic silver halide emulsion selected from the group consisting of a washed, photographic silver chloride emulsion and a washed, photographic silver chlorobromide emulsion containing (1) a sensitizing dye selected from those represented by the following general formula:

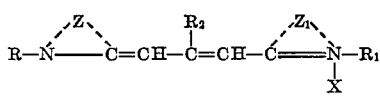

wherein R, $R_1$ and $R_2$ each represents an alkyl group containing from 1 to 2 carbon atoms, X represents an acid radical, and Z and $Z_1$ each represents the non-metallic atoms necessary to complete a heterocyclic nucleus of the benzoxazole series, and (2) from 5 to 35 grams per mol. of silver halide of cadmium chloride.

8. A washed, photographic gelatino-silver-chlorobromide emulsion containing (1) a sensitizing dye selected from those represented by the following general formula:

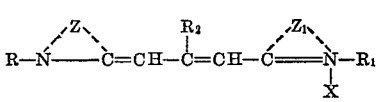

wherein R, $R_1$ and $R_2$ each represents an alkyl group containing from 1 to 2 carbon atoms, X represents an acid radical and Z and $Z_1$ each represents the non-metallic atoms necessary to complete a heterocyclic nucleus of the benzoxazole series, and (2) from 5 to 35 grams per mol. of silver chlorobromide of cadmium chloride.

9. A washed, photographic-gelatino-silver-chlorobromide emulsion supersensitized with a supersensitizing combination comprising 5,5'-diphenyl-3,3',9-triethyloxacarbocyanine iodide and from 5 to 35 grams per mol. of silver chlorobromide of cadmium chloride.

10. A washed, photographic silver halide emulsion selected from the group consisting of a washed, photographic silver chloride emulsion and a washed, photographic silver chlorobromide emulsion containing (1) a sensitizing dye selected from those represented by the following general formula:

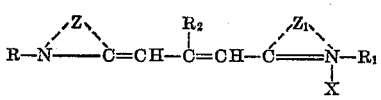

wherein R, $R_1$ and $R_2$ each represents an alkyl group containing from 1 to 2 carbon atoms, X represents an acid radical and Z and $Z_1$ each represents the non-metallic atoms necessary to complete a heterocyclic nucleus of the benzoselenazole series, and (2) from 5 to 35 grams per mol. of silver halide of cadmium chloride.

11. A washed, photographic gelatino-silver-chlorobromide emulsion containing (1) a sensitizing dye selected from those represented by the following general formula:

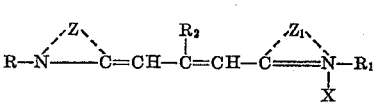

wherein R, $R_1$ and $R_2$ each represents an alkyl group containing from 1 to 2 carbon atoms, X represents an acid radical and Z and $Z_1$ each represents the non-metallic atoms necessary to complete a heterocyclic nucleus of the benzoselenazole series, and (2) from 5 to 35 grams per mol. of silver chlorobromide of cadmium chloride.

12. A washed, photographic-gelatino-silver-chlorocromide emulsion sensitized with a supersensitized combination of 3,3'-diethyl-9-methylselenacarbocyanine iodide and from 5 to 35 grams per mol. of silver chlorobromide of cadmium chloride.

13. A washed, photographic silver halide emulsion selected from the group consisting of a washed, photographic silver chloride emulsion and a washed, photographic silver chlorobromide emulsion containing (1) a sensitizing dye selected from those represented by the following general formula:

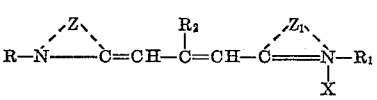

wherein R, $R_1$ and $R_2$ each represents an alkyl group containing from 1 to 2 carbon atoms, X represents an acid radical, Z represents the non-metallic atoms necessary to complete a heterocyclic nucleus of the benzothiazole series, and $Z_1$ represents the non-metallic atoms necessary to complete a heterocyclic nucleus of the 2-quinoline series and (2) from 5 to 35 grams per mol. of silver halide of cadmium chloride.

14. A washed, photographic gelatino-silver-chlorobromide emulsion containing (1) a sensitizing dye selected from those represented by the following general formula:

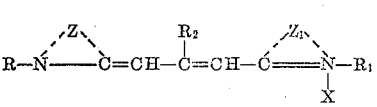

wherein R, $R_1$ and $R_2$ each represents an alkyl group containing from 1 to 2 carbon atoms, X represents an acid radical, Z represents the non-metallic atoms necessary to complete a heterocyclic nucleus of the benzothiazole series, and $Z_1$ represents the non-metallic atoms necessary to complete a heterocyclic nucleus of the 2-quinoline series and (2) from 5 to 35 grams per mol. of silver chlorobromide of cadmium chloride.

15. A washed, photographic-gelatino-silver-chlorobromide emulsion sensitized with a supersensitizing combination of 1',3-dimethyl-9-ethylthia-2'-carbocyanine iodide and from 5 to 35 grams per mol. of silver chlorobromide of cadmium chloride.

16. A washed, photographic gelatino-silver-chloride emulsion containing (1) a sensitizing dye selected from those represented by the following general formula:

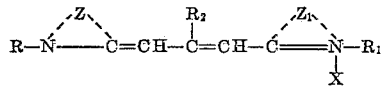

wherein R, $R_1$ and $R_2$ each represents an alkyl group containing from 1 to 2 carbon atoms, X represents an acid radical and Z and $Z_1$ each represents the non-metallic atoms necessary to complete a heterocyclic nucleus of the benzoselenazole series, and (2) from 5 to 35 grams per mol. of silver chloride of cadmium chloride.

17. A washed, photographic-gelatino-silver-chloride emulsion sensitized with a supersensitizing combination comprising 3,3',9-triethylselenacarbocyanine iodide and from 5 to 35 grams per mol. of silver chloride of cadmium chloride.

18. A washed, photographic silver halide emulsion selected from the group consisting of a washed, photographic silver chloride emulsion and a washed, photographic silver chlorobromide emulsion containing (1) a sensitizing dye selected from those represented by the following general formula:

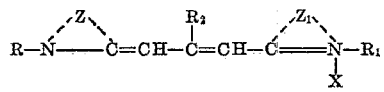

wherein R, $R_1$ and $R_2$ each represents an alkyl group, X represents an acid radical, and Z and $Z_1$ each represents the non-metallic atoms necessary to complete a heterocyclic nucleus selected from the group consisting of those of the benzothiazole series, those of the benzoxazole series, those of the benzoselenazole series, and those of the 2-quinoline series, and (2) from 5 to 35 grams per mol. of silver halide of a metal salt selected from those represented by the following general formula:

wherein M represents a member selected from the group consisting of a cadmium atom and a zinc atom and $X_1$ represents a member selected from the group consisting of a chlorine atom and a bromine atom.

References Cited in the file of this patent
UNITED STATES PATENTS

| | | |
|---|---|---|
| 2,284,877 | Martinez | June 2, 1942 |
| 2,399,083 | Waller | Apr. 23, 1946 |
| 2,432,865 | Dimsdale et al. | Dec. 16, 1947 |
| 2,517,541 | Christensen | Aug. 8, 1950 |
| 2,598,079 | Stauffer et al. | May 27, 1952 |
| 2,618,556 | Hewitson et al. | Nov. 18, 1952 |